United States Patent [19]
Kiedrowski

[11] 3,742,340
[45] June 26, 1973

[54] INDUCTIVE ANGLE POSITION TRANSDUCER

[75] Inventor: James A. Kiedrowski, Phoenix, Ariz.

[73] Assignee: Sperry Rand Corporation, New York, N.Y.

[22] Filed: Feb. 25, 1972

[21] Appl. No.: 229,365

[52] U.S. Cl. ................ 323/51, 323/90, 324/34 PS, 340/199
[51] Int. Cl. ............................................ G01r 33/00
[58] Field of Search ................. 323/51, 53, 56, 85, 323/90; 324/34 PS; 340/195, 196, 198, 199; 336/40, 79

[56] References Cited
UNITED STATES PATENTS

| | | | |
|---|---|---|---|
| 3,217,308 | 11/1965 | Maxwell Jr. | 340/196 |
| 3,394,363 | 7/1968 | Norman | 323/51 X |
| 3,439,256 | 4/1969 | Kahne | 323/51 |
| 3,641,429 | 2/1972 | Cox, Jr. et al. | 324/34 PS |

Primary Examiner—Gerald Goldberg
Attorney—Howard P. Terry

[57] ABSTRACT

An angular position transducer wherein the stator comprises a generally cup-shaped housing of high permeability material the bottom thereof supporting diametrically opposed primary and secondary pole pieces and windings and the side walls thereof constituting a portion of the return path for magnetic flux; the rotor comprises a windingless shorted turn member including a ring or annulus of electrically conductive, non-magnetic material with a diametric shorting portion and adapted to overlie the open ends of the side walls of the housing. The radial spacing of the primary and secondary pole pieces is less than the internal radius of the rotor ring and the diametric shorting portion of the rotor at its null position symmetrically overlies the secondary overlying pole pieces. The magnetic flux return path is provided as an integral part of the rotor and comprises a further ring or annulus of high permeability material concentric with the conductive non-magnetic ring but having an internal diameter substantially less than that of the conductive ring so that it overlies both primary and secondary pole pieces. Alternatively, the rotor flux return path can be a complete disk. This configuration provides an axial running clearance only and thereby eliminates the precision machining normally required with stationary iron-to-iron air gaps. The construction is such that the output signal null position is insensitive to axial and radial translations sometimes unavoidable in the bearings supporting the rotor. The transducer is simple in construction and economical to manufacture using conventional fabrication techniques.

12 Claims, 4 Drawing Figures

INDUCTIVE ANGLE POSITION TRANSDUCER

BACKGROUND OF THE INVENTION

1. Field of the Invention

This invention relates to angular position transducers and more specifically to inductive angular position transducers in which an electrical output signal is induced in a magnetic coil as a function of angular displacement.

2. Description of the Prior Art

A wide variety of angular position transducers are known in the art. U.S. Pat. No. 3,439,256 issued to Robert Kahne on Apr. 15, 1969, for instance, utilizes primary and secondary coils oriented in orthogonal planes. An electrically conductive, non-magnetic rotor in the form of a longitudinally slotted cylinder surrounds the coils. The slotted portion of the cylinder distorts the magnetic field and varies the voltage induced in the secondary coil as the cylinder is rotated.

Other inductive angular transducers are known in which a shorted-turn is rotated in accordance with the angle to be measured and attempt to reduce output null position sensitivities to axial and radial translations. These ordinarily employ stationary iron-to-iron airgaps to control radial sensitivities and overlap to control axial sensitivities. The stationary character of the iron-to-iron air gaps necessitate two precise radial running clearances and thereby entail difficult precision manufacturing techniques.

SUMMARY OF THE INVENTION

The inductive angular position transducer of the present invention employs a rotor which includes both a shorted-turn electrically conductive, non magnetic member and an integral high permeability return path member. The only clearance is axially oriented so the output null position sensitivity to radial translations can be controlled by providing suitable overlap and symmetrical construction. Sensitivity to axial translation is controlled by symmetry of construction.

DESCRIPTION OF THE PREFERRED EMBODIMENTS

Figure 1:
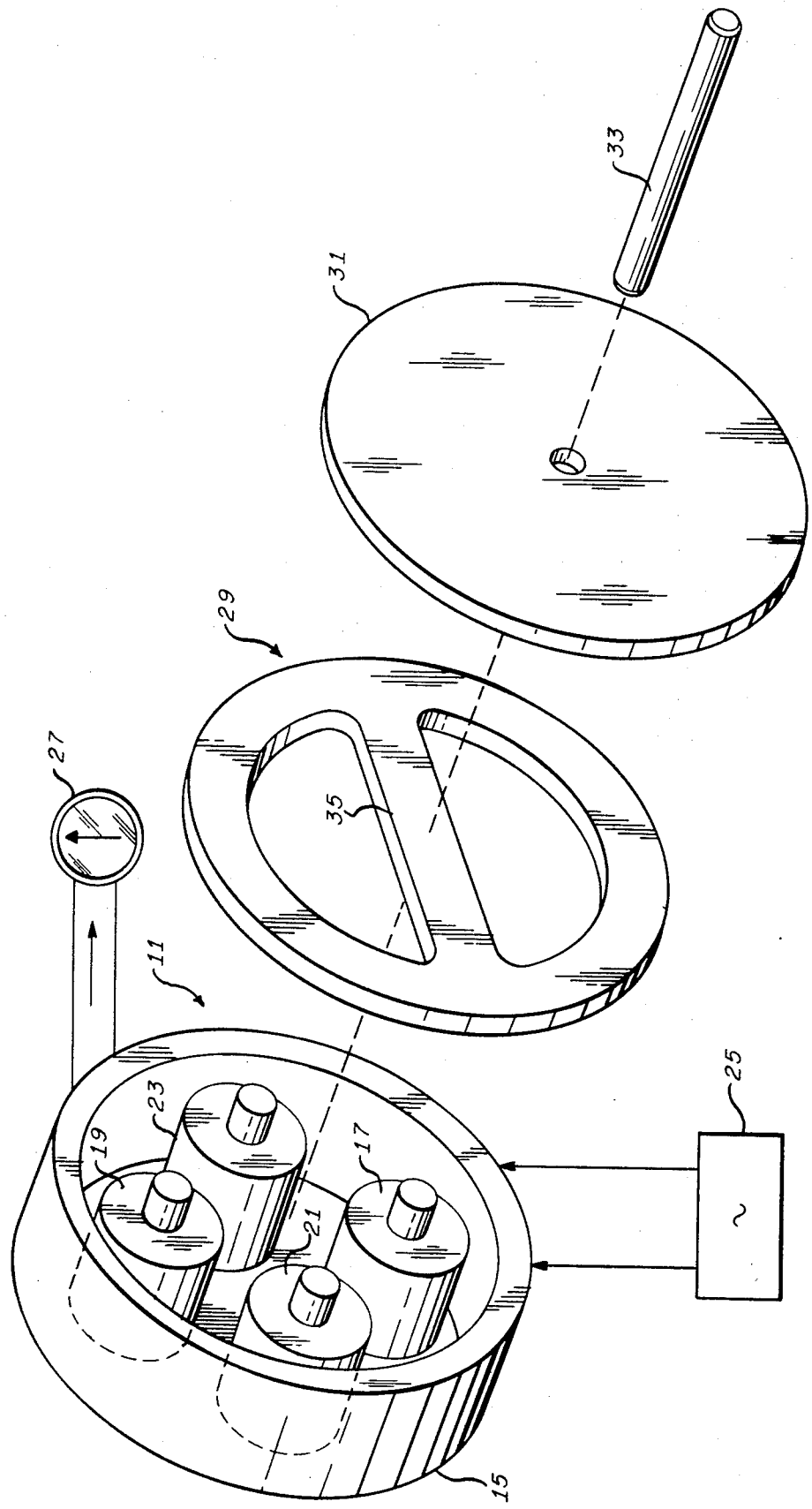
FIG. 1 is an exploded perspective view of the presently preferred embodiment of the invention.

FIG. 1 illustrates the construction of four pole embodiment of a transducer constructed in accordance with the present invention. The stator member 11 includes an open-ended or generally cup-shaped housing formed from a high permeability material. The housing includes a transverse disk-like base member 13 and a longitudinally extending sleeve-like side wall member 15. The housing member 11 may be easily fabricated on a lathe or other turning machine where the part and/or tool rotate.

Mounted within the housing are a pair of primary coils 17 and 19 and a pair of secondary coils 21 and 23. In this embodiment, the primary coils are wound in series opposing relationship so that the outer ends of the two magnetic cores, for instance, will form opposite magnetic poles at the same time. The primary coils 17 and 19 are energized from a suitable source of alternating current 25. Although the frequency of the alternating current applied to the primary winding is not critical, in the present embodiment this frequency is in the order of 4,800 hertz selected on the basis of specific dimensional design restraints and frequency response criteria. In general, the smaller the overall design, the higher are the frequencies required and visa versa.

The secondary coils 21 and 23, in the four pole arrangement illustrated, are disposed along a diameter at right angles to the diameter on which the primary coils are mounted. Each of the primary and secondary coils is equidistant from the axis so as to be disposed along a common annulus. The two secondary coils are also wound in series opposition and their combined output is applied to a suitable output device, here illustrated as an indicating device 27.

Typically, the device of the present invention may be incorporated as a position transducer for determining the angular orientation of the gimbal of a gyroscopic device. In such applications, axial rotor/stator clearance may be on the order of 0.010 inch depending upon the support bearing requirements. In one application the pick-off served as the signal generator for a closed loop gimbal servo drive. This transducer is especially useful as a gyro pick-off because of its sensitivity, its linearity over a relatively wide range, its null position sensitivity characteristics and its very low reaction torque characteristic.

The rotor of the transducer includes a high conductivity, non-magnetic shorted-turn member 29 and an integral high permeability member 31, fixedly mounted on a support shaft 33 which rotates with the device whose angular displacement is to be measured. The high conductivity member 29 is typically a planar element constructed in the form of a ring intersected by a diametrical shorting member 35. The inside diameter of the ring is preferably approximately the same as, or a little greater than the outer diameter of the annulus defined by the four coils. The outside diameter of the ring is preferably substantially equal to the outside diameter of the housing. It will be understood that in very small versions of the transducer, the shorting member 35 may be enlarged at its central area if necessary to accomodate the rotor support shaft.

The outside diameter of the high permeability return path member 31 may also have an external diameter equal to that of the housing on an internal diameter such as to completely overlay the magnetic poles. Alternatively, it may be a disk.

In accordance with the principles of the present invention, the high conductivity member 29 is mounted directly on the high permeability member 31 to form an integral rotor assembly. Thus both the shorted turn member and flux return member become part of the rotor element. This permits the use of an axial air gap which enables the null position sensitivity to axial displacements to be controlled by virtue of the symmetry of the system. Furthermore, radial translations may be controlled by overlap and symmetry techniques.

Preferably, the rotor is mounted as close to the open end of the housing as practical. In a typical gyro pick-off application, the axial air gap may have a length in the order of 0.010 inches.

The transducer may be assembled so that, with the diametrical conducting portion 35 in its zero or null angular position, it symmetrically overlies the opposed secondary coils 21 and 23. Alternatively, the diametrical portion 35 may be arranged so that in its null position it overlies the opposed primary coils 17 and 19. The performance with the latter arrangement will be the same except that there will be a larger reaction torque on the rotor shaft with displacement due to the change in induced currents with the displacement. It should be appreciated that the transducer of the present invention provides low reaction torques. Such a feature is especially important in gyroscopic applications.

Figure 2:
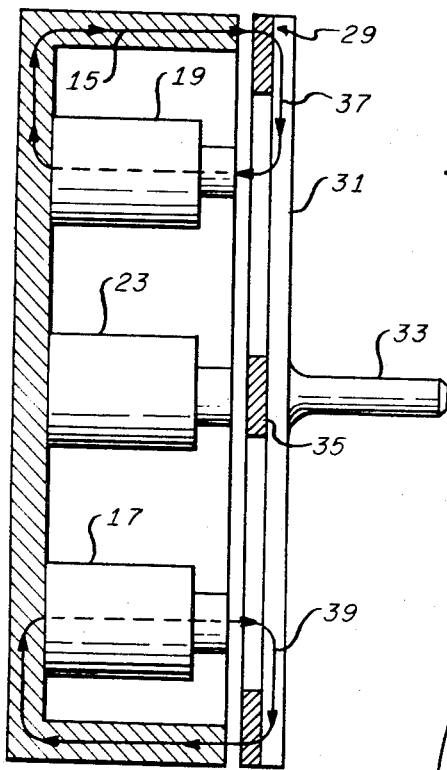
FIG. 2 is a vertical cross-sectional view of a transducer useful in explaining the invention.

FIG. 2 is a vertical cross-section of the transducer of FIG. 1 with the parts assembled in normal operating condition. In FIG. 2 the shaft 33 is in a position such that the diametrical portion 35 of the high conductivity member is in its null position. Typical flux lines 37 and 39 have also been depicted in FIG. 2 to illustrate the manner in which the currents are induced in the high conductivity member across a single axial air gap. Thus, for instance, assume that an energizing current exists in the primary coils 17 and 19 and is flowing in such a direction that the outer end of the magnetic core supporting the coil 19 forms a south magnetic pole whereas the corresponding outer end of the magnetic core supporting the coil 17 forms a north magnetic pole. The magnetic flux associated with each of the primary windings 17 and 19 will flow in a clockwise direction in each case. Under the assumed conditions, currents will be induced in each of the upper and lower halves of the high conductivity ring in a direction away from the observer and into the paper at this time. Each of these currents will be returned through the diametrical portion 35.

Figure 3:
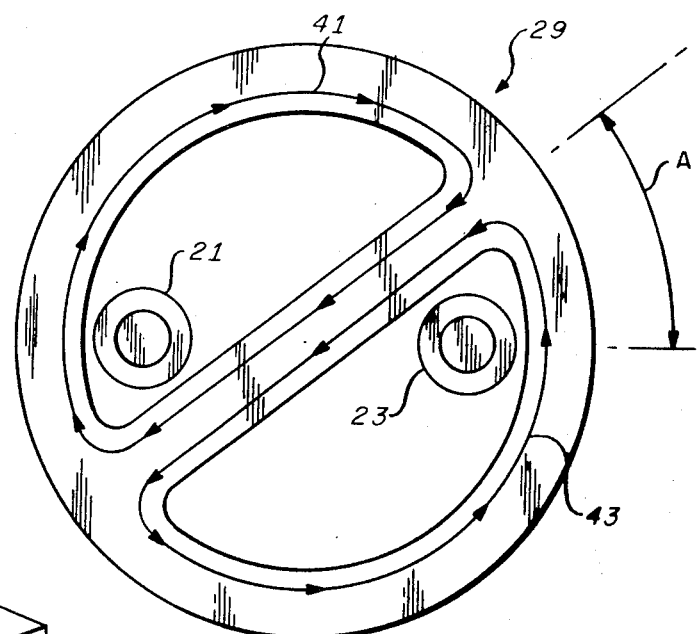
FIG. 3 is a diagram useful in explaining the invention.

The manner in which these currents interact with the secondary coils may be understood by referring to FIG. 3. Assume that a current is flowing in the upper half of the high conductivity member 29 along a path 41 and that a corresponding current is flowing through the lower half of the high conductivity member along a path 43. Assume further that the rotor has been rotated through an angle A so that the diametrical member 35 is above the secondary coil 23 but passes below the secondary coil 21. Voltages will be induced in each of the secondary windings as a result of the flux associated with each of the currents in the member 29. The voltage induced in the coil 23 will arise predominantly from the flux associated with the current in path 43 since this path is more closely coupled to the coil 23 under the assumed angular displacement. Similarly, voltage induced in the coil will arise mainly from the current in the path 41.

The coil 23 will therefore be exposed to flux associated with a current effectively rotating in a counter-clockwise direction around the coil 23 whereas the coil 21 will be exposed to flux associated with current effectively rotating around that coil in a clockwise direction. Thus the voltage induced in the coils 21 and 23 will be out of phase with each other. However, since the secondary coils 21 and 23 are connected in series opposition, the total voltage applied to the indicating device will actually be the sum of the voltages induced in the two coils.

As the displacement angle A is reduced, the voltage induced in each secondary coil will be increasingly influenced by the current in the remote current path. When the displacement angle A is reduced to zero, so that the rotor is in the null position wherein the diametric portion 35 is aligned with the coils 21 and 23, each secondary winding will be equally influenced by flux arising from the current in the two paths. Under these conditions, substantially no net voltage will be induced in either of the coils 21 and 23.

If, now, the rotor is displaced in the clockwise direction, each coil will be predominantly affected by the current in the alternate current path. Thus the phase of the voltages induced in each coil will be reversed and therefore the phase of the resultant output voltage applied to the output means will be reversed.

It has been found that transducers constructed in accordance with the present invention have a useful range of about ±25° of angular displacement.

Figure 4:
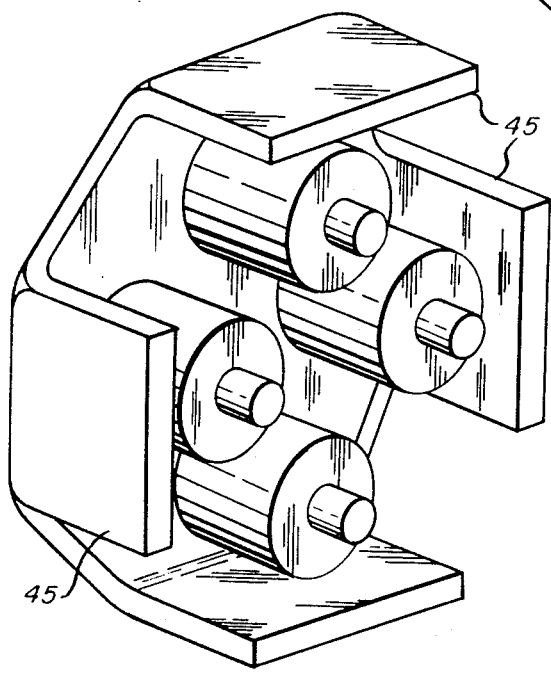
FIG. 4 is a perspective view illustrating another embodiment of the invention.

In some situations, it may be preferred to use a stator of the form shown in FIG. 4. In this embodiment the stator housing may be fabricated by conventional stamping techniques wherein separate tab-like members 45 are used in place of the continuous sleeve member 15 of FIG. 1.

A transducer employing the stator of FIG. 4 operates according to the same basic principles as and includes all of the advantages of, the transducer employing the continuous wall or sleeve type housing member. A sleeve type housing may be preferred in some instances, where, for instance, the transducer is required to be mounted in such a difficult position that a mechanical mounting means must be formed or fabricated on the housing member using a turning technique. This fabrication technique allows an integral mount and housing to be formed.

While but two embodiments of the present invention have been illustrated, other configurations embodying the concepts thereof will be readily apparent to those skilled in this art. For example, an eight pole stator with two diametrical shorting portions on the rotor may be employed. While this configuration halves the angular range of the device, its sensitivity will be doubled. Also, instead of a completely circular device, a semi-circular device may be constructed in which case but a single excitation coil is required. The sensitivity may be less, but physical restraints may justify this configuration. Similarly, the principles of the present invention may be applied to configurations wherein the rotor elements occupy less that 180° of arc.

With the transducer of the present invention, the axial air gap configuration permits the output signal null position to be essentially insensitive to radial and axial translations such as those that might be caused by support bearing looseness. In either case, the transducer may be constructed with relatively simple fabricating techniques. The effects of radial and axial translation may be minimized and controlled by overlap and symmetry construction. Since the flux return path provided by the high permeability disk 31 is an integral part of the rotor, it may conveniently be assembled in actual contact with the high conductivity member 29. This minimizes the length of the air gap and permits a structure wherein the flux lines within the air gap are essentially laminar.

The rotor high conductivity and high permeability members may conveniently be constructed as stampings and either cemented, soldered, welded or mounted together in any convenient fashion. In either embodiment the sleeve and/or tab type housing provides protection for the coils against possible nicking or other physical damage.

In some applications, it may be preferable to mount the various coils on a flat high permeability base and form the high permeability rotor element as a cup-shaped member wherein the side walls rotate with the rotor.

Although rotor members have been described as being substantially planar, it will be appreciated that this description is not intended to preclude devices in which such members contain non-planar central portions such as mounting hubs and the like.

Since the stator windings used in the present invention are configured about cylindrical core members and supported on a flat surface, these coils may be individually wound on coil forms and subsequently assembled with relative ease. The axial construction configuration which fits diameters within diameters and lengths within lengths is conductive to simplicity in fabrication and to miniaturization.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. An angular position transducer comprising an input member mounted for rotation about an axis, a rotor mounted on said member and rotatable therewith, and a stator positioned adjacent to said rotor and disposed symmetrically about said axis, said rotor including a generally planar shorted-turn member and a generally planar high permeability member, both fixedly mounted in adjacent relation on said member and disposed transversely and symmetrically about said axis, said shorted-turn member being constructed of a high conductivity non-magnetic material and containing a ring-like portion intersected by a diametrical portion so as to form first and second current paths, each of said current paths consisting of a different semi-circular region of said ring-like portion and said diametrical portion, said high permeability member being diametrically substantially coextensive with said ring-like portion, said stator including a housing fabricated from a high permeability material and including a transversely extending base means and longitudinally extending outer wall means together forming an open-ended housing, said rotor and stator being so relatively positioned that said shorted-turn member overlies the open end of said housing, first magnetic means within said housing for inducing oppositely directed currents in the ring-like portions of said first and second current paths respectively, and second magnetic means within said housing inductively coupled to said shorted-turn member and positioned to respond to currents flowing in the region of the intersection of said ring-like portion and said diametrical portion for proving an output signal proportional to the relative angular displacement of said rotor and stator.

2. The transducer of claim 1 in which said second magnetic means includes first and second secondary coils each mounted on separate longitudinally extending magnetic cores positioned diametrically opposite each other on said transverse base means, said cores being mounted at a distance from said axis no greater than the internal radius of said ring-like portion.

3. The transducer of claim 2 wherein said first and second secondary coils are connected in series opposing relationship whereby to provide an output signal proportional to the relative angular displacement of said rotor and stator.

4. The transducer of claim 3 wherein the first magnetic means includes first and second primary coils each mounted on separate longitudinally extending magnetic cores positioned diametrically opposite each other in said transverse base means on a line at right angles to the diameter containing said secondary coils, all of said coils being further positioned equidistant from said axis, said first and second coils being connected to induce first and second counter-rotating currents, respectively, in said ring-like portion.

5. The transducer of claim 4 wherein the shorted turn member has an electrical conductivity much greater than the high permeability member and wherein the shorted turn member and high permeability member form an integral, unitary transducer rotor.

6. The transducer of claim 5 wherein the outside transverse dimension of the housing is substantially equal to the diameter of the shorted-turn member and the high permeability member.

7. The transducer of claim 1 wherein said wall means is in the form of a cylindrical sleeve.

8. The transducer of claim 1 wherein said wall means includes a plurality of flat tab-like members.

9. An angular position transducer comprising a rotor supported for rotation about an axis and a stator arranged symmetrically about the same axis, said stator member including:

a housing formed of high permeability material, including transverse circular base means and longitudinally extending wall means formed along the periphery of the base means, a plurality of coil means supported on individual longitudinally extending magnetic cores within said housing and disposed at 90° intervals along an annulus on said base means, a first pair of said coil means being supported on diametrically opposite magnetic cores and connected in series opposing relationship, a second pair of said coil means being supported on the remaining magnetic cores and connected in series opposing relationship, said rotor including:

a planar electrically conducting non-magnetic member and a high permeability disk member both mounted integrally on a common rotatable input member and coaxial with said axis, said conducting member including a flat ring-line portion intersected by a flat diametrical portion, said ring-like member having an internal diameter at least as great as the diameter of said annulus and being symmetrically disposed about said axis in a transverse plane in close proximity to the open end of said housing, said high permeability disk member being symmetrically disposed about said axis in a transverse plane adjacent said conducting member, means to supply alternating current to the first pair of coils, and means to connect output apparatus across said second pair of coils.

10. An electrical transducer of the inductive, shorted turn type having stator and rotor members supported for relative movement and having an air gap therebetween, said stator member including a base of high permeability material including a plurality of input and output core and winding elements and magnetic flux return portions, said core elements and flux return portions being arranged to provide substantially parallel magnetic flux paths across said air gap, said rotor comprising a first rotor member including a substantially planar shorted turn element of electrically conductive non-magnetic material disposed for movement in a plane perpendicular to said parallel flux paths and cooperable therewith to couple currents between said input and output windings dependent upon relative movement of said rotor member therebetween, and a second substantially planar flux return path member of high permeability material integrally mounted on and moveable with said rotor whereby to define but a single axial air gap threaded by said magnetic flux.

11. An electrical position transducer comprising stator and rotor parts supported for relative rotation about a common axis and defining an air gap therebetween, said stator part comprising a base portion extending transversely of said axis and input and output core and coil means supported thereon in spaced symmetrical relation to said axis, said input core and coil means adapted to produce magnetic flux paths through said air gap parallel to said axis, said rotor part comprising a generally planar, shorted turn member of high conductivity non-magnetic material including an arcuate portion and a shorted turn portion and arranged in said air gap flux paths to couple currents between said input and output core and coil means dependent upon the movement of said rotor member therebetween, and said rotor part comprising a further member of high permeability material integrally mounted on and rotatable with said rotor shorted turn member and having radial dimensions sufficient to provide radial return paths for the magnetic flux paths through said shorted turn portion back to said stator base part whereby to provide but a single axial air gap for said magnetic flux.

12. The transducer as set forth in claim 10 wherein said stator member includes a semi-circular base portion and having flux return side wall portions extending therefrom generally parallel to said axis, said input and output core and coil means being supported thereon in radially spaced relation in orthogonal planes intersecting at said axis and cooperating with said side wall portions to define said magnetic flux paths, said rotor arcuate portion is semicircular and said shorted turn portion is diametrical, said arcuate member magnetically coupling one of said input and output core and coil means and diametrical portion magnetically coupling the others of said core and coil means, and said rotor high permeability member including a corresponding generally planar semicircular portion having a radial dimension such as to provide said radial magnetic flux return path between said core and coil means and said stator side wall portions.

* * * * *

UNITED STATES PATENT OFFICE
CERTIFICATE OF CORRECTION

Patent No. 3,742,340            Dated June 26, 1973

Inventor(s) James A. Kiedrowski

It is certified that error appears in the above-identified patent and that said Letters Patent are hereby corrected as shown below:

In the Abstract:
    Right hand column, line 13: delete "overlying".

In the Specification:
    Column 1, line 22: delete "and" and substitute --in an--;
               line 58: delete "13".

In the Claims:
    Claim 1, column 5, line 65: delete "proving" and substitute --providing--.

Signed and sealed this 6th day of August 1974.

(SEAL)
Attest:

McCOY M. GIBSON, JR.           C. MARSHALL DANN
Attesting Officer               Commissioner of Patents